US010608478B2

(12) United States Patent
Yamakawa et al.

(10) Patent No.: US 10,608,478 B2
(45) Date of Patent: Mar. 31, 2020

(54) POWER TRANSMISSION SYSTEM

(71) Applicants: EQUOS RESEARCH CO., LTD., Tokyo (JP); TOYOTA JIDOSHA KABUSHIKI KAISHA, Toyota-shi, Aichi-ken (JP)

(72) Inventors: Hiroyuki Yamakawa, Hokkaido (JP); Kenichiro Sato, Tokyo (JP); Shinji Ichikawa, Aichi (JP); Naoki Gorai, Aichi (JP)

(73) Assignees: EQUOS RESEARCH CO., LTD., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 601 days.

(21) Appl. No.: 15/127,217

(22) PCT Filed: Mar. 13, 2015

(86) PCT No.: PCT/JP2015/057452
§ 371 (c)(1),
(2) Date: Sep. 19, 2016

(87) PCT Pub. No.: WO2015/170510
PCT Pub. Date: Nov. 12, 2015

(65) Prior Publication Data
US 2017/0106759 A1 Apr. 20, 2017

(30) Foreign Application Priority Data
May 7, 2014 (JP) .................................. 2014-095944

(51) Int. Cl.
*H02J 50/70* (2016.01)
*H02J 7/02* (2016.01)
(Continued)

(52) U.S. Cl.
CPC .............. *H02J 50/70* (2016.02); *B60L 53/12* (2019.02); *H02J 7/025* (2013.01); *H02J 50/12* (2016.02);
(Continued)

(58) Field of Classification Search
CPC . H02J 50/12; H04B 15/00; H04B 2230/5429; H04B 2230/5425; B60L 2270/14
(Continued)

(56) References Cited

U.S. PATENT DOCUMENTS 8,093,745 B2 * 1/2012 Cern ...................... G01R 23/06
307/104
2010/0289449 A1 * 11/2010 Elo ......................... H02J 7/025
320/108
(Continued)

FOREIGN PATENT DOCUMENTS

JP  2009-135346 A  6/2009
JP  2010-087024 A  4/2010
(Continued)

OTHER PUBLICATIONS

Dec. 1, 2017 Search Report issued in European Patent Application No. 15789844.6.

*Primary Examiner* — Daniel Kessie
*Assistant Examiner* — Swarna N Chowdhuri
(74) *Attorney, Agent, or Firm* — Oliff PLC

(57) ABSTRACT

A power transmission system transmits electric energy to a secondary resonator having a secondary resonator coil through an electromagnetic field of a predetermined frequency from a resonator having a resonator coil and reduces noise using two noise cancellation resonators with one predetermined frequency and its higher harmonic component set as noise reduction target frequency. The system includes, as two noise cancellation resonators, a first noise
(Continued)

cancellation resonator including a first noise cancellation resonator coil and has a resonance frequency higher than the noise reduction target frequency by a first shift frequency determined according to a coupling degree between the resonator coil and first noise cancellation resonator coil and second noise cancellation resonator including a second noise cancellation resonator coil and has a resonance frequency lower than the noise reduction target frequency by a second shift frequency according to coupling degree between the resonator coil and second noise cancellation resonator coil.

6 Claims, 8 Drawing Sheets

(51) Int. Cl.
    *H02J 50/80*     (2016.01)
    *H02J 50/12*     (2016.01)
    *B60L 53/12*     (2019.01)
    *H02J 50/90*     (2016.01)

(52) U.S. Cl.
    CPC .............. *H02J 50/80* (2016.02); *H02J 50/90* (2016.02); *Y02T 10/7005* (2013.01); *Y02T 90/122* (2013.01)

(58) Field of Classification Search
    USPC .......................................................... 307/104
    See application file for complete search history.

(56) References Cited

U.S. PATENT DOCUMENTS

| | | | |
|---|---|---|---|
| 2010/0309080 A1* | 12/2010 | Minemura | H01Q 7/00 343/788 |
| 2011/0101792 A1 | 5/2011 | Koumoto | |
| 2011/0221438 A1* | 9/2011 | Goodwill | G01R 33/10 324/301 |
| 2012/0056487 A1 | 3/2012 | Choi et al. | |
| 2012/0326499 A1* | 12/2012 | Ichikawa | B60L 11/182 307/9.1 |
| 2013/0147283 A1 | 6/2013 | Kawano et al. | |
| 2014/0111022 A1 | 4/2014 | Yamakawa | |
| 2015/0028798 A1* | 1/2015 | Dearden | A61N 1/36125 320/107 |
| 2015/0094009 A1* | 4/2015 | Yosui | H03H 7/463 455/307 |
| 2015/0145343 A1* | 5/2015 | Chiyo | H01F 27/38 307/104 |

FOREIGN PATENT DOCUMENTS

| | | |
|---|---|---|
| JP | 2011-147213 A | 7/2011 |
| JP | 4921466 B2 | 4/2012 |
| JP | 2012-115069 A | 6/2012 |
| WO | 2007/008646 A2 | 1/2007 |
| WO | 2010/001540 A1 | 1/2010 |
| WO | 2012/029179 A1 | 3/2012 |
| WO | 2013/045999 A2 | 4/2013 |

* cited by examiner

Equivalent circuit

View schematically illustrating state of current and electric field in first extreme-value frequency (frequency upon coupling under magnetic wall condition)

View schematically illustrating state of current and electric field in second extreme-value frequency (frequency upon coupling under electric wall condition)

Coupling under magnetic wall condition (A)

Coupling under electric wall condition (B)

Coupling under magnetic wall condition (A)

Coupling under electric wall condition (B)

POWER TRANSMISSION SYSTEM

TECHNICAL FIELD

The present invention relates to a power transmission system that wirelessly transmits/receives power using a magnetic resonance method.

BACKGROUND ART

A magnetic resonance wireless power transmission system makes a resonance frequency of a transmission-side antenna and a resonance frequency of a reception-side antenna equal to each other to thereby perform efficient energy transmission from the transmission-side antenna to reception-side antenna and has a particular feature in that it can realize a power transmission distance of several tens of centimeters to several meters.

When such a magnetic resonance wireless power transmission system is used in a power station for vehicles such as electric vehicles, the reception-side antenna is mounted on a bottom part of the vehicle, and power is supplied from the transmission-side antenna buried above the ground to the reception-side antenna. In such a power transmission form, it is difficult for the transmission-side antenna and reception-side antenna to be completely electromagnetically coupled to each other, and much noise may be radiated from the antenna to cause a temperature rise of a metal part at the vehicle bottom.

To cope with this problem, in the wireless power transmission system, it is necessary to discuss measures to reduce noise generated from the antenna.

For example, as a technology to reduce high-frequency noise, Patent Document 1 (JP 2010-87024A) discloses that a resonance circuit composed of a conductor having a loop-shaped closed path and a capacitor electrically connected to the closed path is provided near a noise source.
Patent Document 1: JP 2010-87024A

DISCLOSURE OF THE INVENTION

Problems to be Solved by the Invention

In the conventional technology described in Patent Document 1, a resonance frequency of an LC resonator for noise cancellation is matched with a frequency of noise to be removed so as to increase a noise reduction effect.

However, particularly in a wireless power transmission system that uses a magnetic resonance antenna, even when a frequency of the noise cancellation resonator is matched with the noise source frequency, a high noise reduction effect cannot always be obtained.

Means for Solving the Problems

To solve the above problem, according to the present invention, there is provided a power transmission system that transmits electric energy to a secondary resonator having a secondary resonator coil through an electromagnetic field of a predetermined frequency generated from a primary resonator having a primary resonator coil and that reduces noise using two noise cancellation resonators with one of the predetermined frequency and its higher harmonic component set as a noise reduction target frequency. The power transmission system includes, as the two noise cancellation resonators, a first noise cancellation resonator that includes a first noise cancellation resonator coil and has a resonance frequency higher than the noise reduction target frequency by a first shift frequency determined according to a coupling degree between the primary resonator coil and the first noise cancellation resonator coil and a second noise cancellation resonator that includes a second noise cancellation resonator coil and has a resonance frequency lower than the noise reduction target frequency by a second shift frequency determined according to a coupling degree between the primary resonator coil and the second noise cancellation resonator coil.

In the power transmission system according to the present invention, the primary resonator coil includes a main coil formed by winding a conductive wire about a first reference axis parallel to the ground, and the first noise cancellation resonator coil is formed by winding a conductive wire, outside a space formed by an extended surface of a winding end face of the main coil, about a second reference axis parallel to the first reference axis.

Further, in the power transmission system according to the present invention, the primary resonator coil includes a main coil formed by winding a conductive wire about a first reference axis parallel to the ground, and the second noise cancellation resonator coil is formed by winding a conductive wire, inside a space formed by an extended surface of a winding end face of the main coil, about a third reference axis parallel to the first reference axis.

Further, in the power transmission system according to the present invention, the first shift frequency is represented by the following expression.

$$f_{s2} = \frac{1}{2\pi\sqrt{L_{m2}C_{n2}}} \quad \text{[Numeral 8]}$$

where a mutual inductance component between the primary resonator coil and the first noise cancellation resonator coil is $L_{m1}$, and a capacitance component of the first noise cancellation resonator coil is $C_{n1}$.

Further, in the power transmission system according to the present invention, the second shift frequency is represented by the following expression.

$$f_{s2} = \frac{1}{2\pi\sqrt{L_{m2}C_{n2}}} \quad \text{[Numeral 14]}$$

where a mutual inductance component between the primary resonator coil and the second noise cancellation resonator coil is $L_{m2}$, and a capacitance component of the second noise cancellation resonator coil is $C_{n2}$.

Further, in the power transmission system according to the present invention, a Q-value of the noise cancellation resonator coil is 50 or more.

Advantages of the Invention

The power transmission system according to the present invention includes the noise cancellation resonator having the noise cancellation resonator coil and has a resonance frequency higher than the predetermined frequency by a shift frequency determined according to a coupling degree between the primary resonator coil and the noise cancellation resonator coil. Thus, according to the power transmission system of the present invention, it is possible to suppress occurrence of noise particularly in the wireless power transmission system using a magnetic resonance antenna (resonator) and thereby to reduce noise leakage.

BEST MODE FOR CARRYING OUT THE INVENTION

Figure 1:
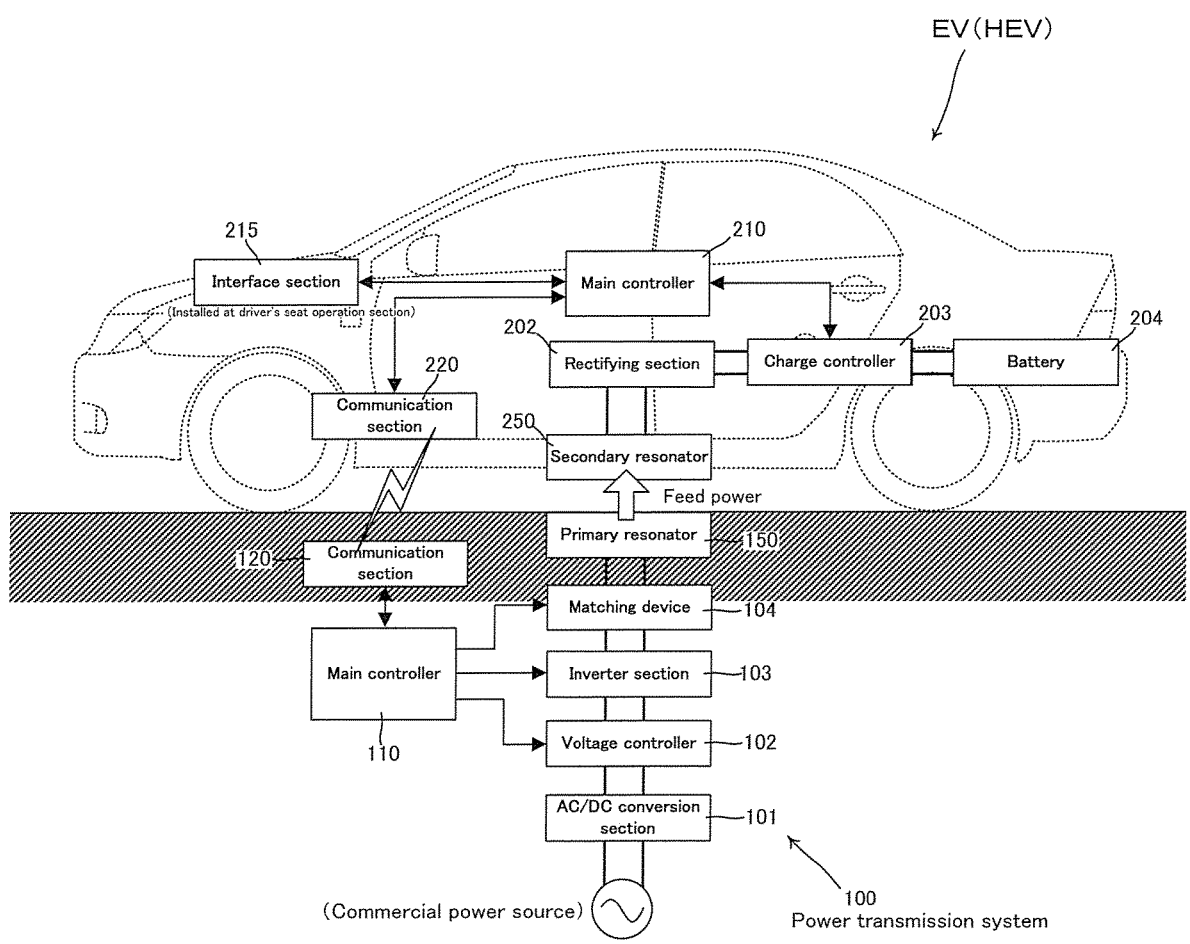
FIG. 1 is a block diagram of a power transmission system according to an embodiment of the present invention.

Hereinafter, an embodiment of the present invention will be described with reference to the drawings. FIG. 1 is a block diagram of a power transmission system according to an embodiment of the present invention. In the present embodiment, a primary resonator 150 and a secondary resonator 250 are used respectively as transmission- and reception-side antennas constituting the power transmission system.

For example, as a power transmission system using an antenna according to the present invention, a system for charging the battery of vehicles such as electric vehicles (EV) and hybrid electric vehicles (HEV) is assumed. The power transmission system transmits power to the vehicle of a type described above in a non-contact manner and is thus provided in a parking space of the vehicle. A user of the vehicle stops his or her own vehicle in the parking space where the power transmission system is provided and makes the secondary resonator 250 mounted on the vehicle and primary resonator 150 face each other to thereby receive power from the power transmission system.

In the power transmission system, a resonance frequency of the primary resonator 150 on a power transmission system 100 side and a resonance frequency of the secondary resonator 250 on a power reception system 200 side are made equal to each other for efficient power transmission from the primary resonator 150 to secondary resonator 250 so as to allow efficient energy transmission from a transmission-side antenna to a reception-side antenna.

An AC/DC conversion section 101 in the power transmission system 100 is a converter that converts an input commercial power source into a constant DC power. An output from the AC/DC conversion section 101 may be increased to a predetermined voltage in a voltage controller 102. A value of the voltage generated in the voltage controller 102 can be set under the control of a main controller 110.

Figure 2:
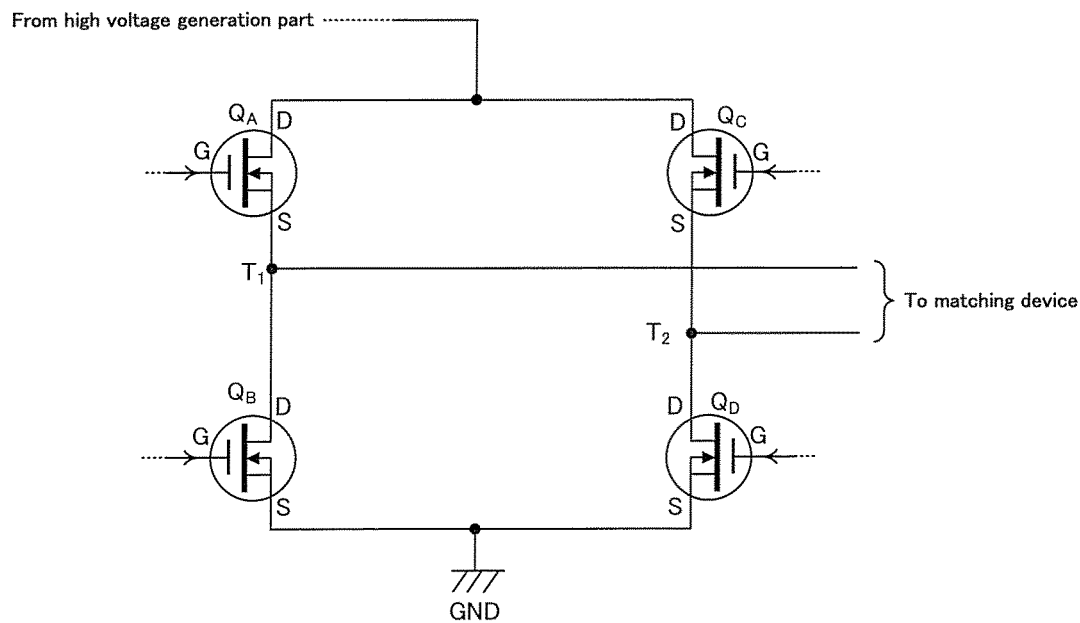
FIG. 2 is a view illustrating an inverter section of the power transmission system.

An inverter section 103 generates a predetermined AC voltage from the voltage supplied from the voltage controller 102 and inputs the AC voltage to a matching device 104. FIG. 2 is a view illustrating the inverter section of the power transmission system. As illustrated in FIG. 2, the inverter section 103 is composed of four field-effect transistors (FETs) $Q_A$ to $Q_D$ connected in a full-bridge configuration.

In the present embodiment, the matching device 104 is connected between a connection portion T1 between the switching elements $Q_A$ and $Q_B$ connected in series and a connection portion T2 between the switching elements $Q_C$ and $Q_D$ connected in series. When both the switching elements $Q_A$ and $Q_D$ are ON, both the switching elements $Q_B$ and $Q_C$ are OFF, and when both the switching elements $Q_B$ and $Q_C$ are ON, both the switching elements $Q_A$ and $Q_D$ are OFF, whereby an AC voltage of a rectangular wave is generated between the connection portions T1 and T2. In the present embodiment, a frequency of the rectangular wave generated by switching the respective switching elements ranges from about 20 kHz to about several 100 kHz.

A drive signal to the switching elements $Q_A$ to $Q_D$ constituting the inverter section 103 is input from the main controller 110. Further, a frequency for driving the inverter section 103 is controlled by the main controller 110.

The matching device 104 includes a passive element having a predetermined circuit constant and receives an output from the inverter section 103. An output of the matching device 104 is supplied to the primary resonator 150. The circuit constant of the passive element constituting the matching device 104 can be adjusted based on an instruction from the main controller 110. The main controller 110 issues an instruction to the matching device 104 so as to make the primary resonator 150 and secondary resonator 250 to resonate with each other. The matching device 104 is not essential.

The primary resonator 150 includes a primary resonator coil 160 having an inductive reactance component and a primary resonator capacitor 170 having a capacitive reactance component. The primary resonator 150 resonates with the vehicle-mounted secondary resonator 250 disposed opposite thereto to make it possible to supply electric energy output from the primary resonator 150 to the secondary resonator 250. The primary resonator 150 and secondary resonator 250 function as a magnetic resonance antenna section in the power transmission system 100.

The main controller 110 of the power transmission system 100 is a general-purpose information processing section including a CPU, a ROM that stores a program operating on the CPU, and a RAM serving as a work area of the CPU. The main controller 110 collaborates with the illustrated components connected thereto.

A communication section 120 performs wireless communication with a communication section 220 on the vehicle side to exchange data with the vehicle side. The data received by the communication section 120 is transferred to the main controller 110; conversely, the main controller 110 can transmit predetermined information to the vehicle side through the communication section 120.

The following describes components provided on the vehicle side. In a power reception side system of the vehicle, the secondary resonator 250 resonates with the primary resonator 150 to thereby receive electric energy output from the primary resonator 150. The secondary resonator 250 is mounted to a bottom surface portion of the vehicle.

The secondary resonator 250 includes a secondary resonator coil 260 having an inductive reactance component and a secondary resonance capacitor 270 having a capacitive reactance component.

The AC power received by the secondary resonator 250 is rectified in a rectifying section 202, and the rectified power is transmitted to a battery 204 through a charge controller 203 and then stored in the battery 204. The charge controller 203 controls the charging of the battery 204 based on an instruction from a main controller 210. More specifically, an output from the rectifying section 202 is increased or reduced to a predetermined voltage value in the charge controller 203, so as to be stored in the battery 204. Further, the charge controller 203 is configured to manage a residual amount of the battery 204.

The main controller 210 is a general-purpose information processing section including a CPU, a ROM that stores a program operating on the CPU, and a RAM serving as a work area of the CPU. The main controller 210 collaborates with the illustrated components connected thereto.

An interface section 215 is provided at a driver's seat portion of the vehicle and is configured to provide predetermined information to the user (driver) or receives operation/input from the user. The interface section 215 includes a display device, buttons, a touch panel, and a speaker. When a predetermined operation is performed by the user, data corresponding to the operation is transmitted as operation data from the interface section 215 to the main controller 210 and processed therein. When predetermined information is provided to the user, display instruction data for displaying the predetermined information is transmitted from the main controller 210 to interface section 215.

A communication section 220 on the vehicle side performs wireless communication with the communication section 120 on the power transmission side to exchange data with the system on the power transmission side. The data received by the communication section 220 is transferred to the main controller 210; conversely, the main controller 210 can transmit predetermined information to the power transmission system side through the communication section 220.

A user who needs to receive power by using the above power transmission system stops his or her own vehicle in a parking space where the power transmission side system as described above is provided and inputs an instruction to perform charging through the interface section 215. Upon reception of the instruction, the main controller 210 acquires a residual amount of the battery 204 from the charge controller 203 and calculates an amount of power required to charge the battery 204. The calculated power amount and information requesting power transmission are transmitted from the communication section 220 on the vehicle side to the communication section 120 of the power transmission side system. Upon reception of the calculated power amount and information requesting power transmission, the main controller 110 of the power transmission side system controls the voltage controller 102, inverter section 103, and matching device 104 to thereby transmit power to the vehicle side.

Figure 3:
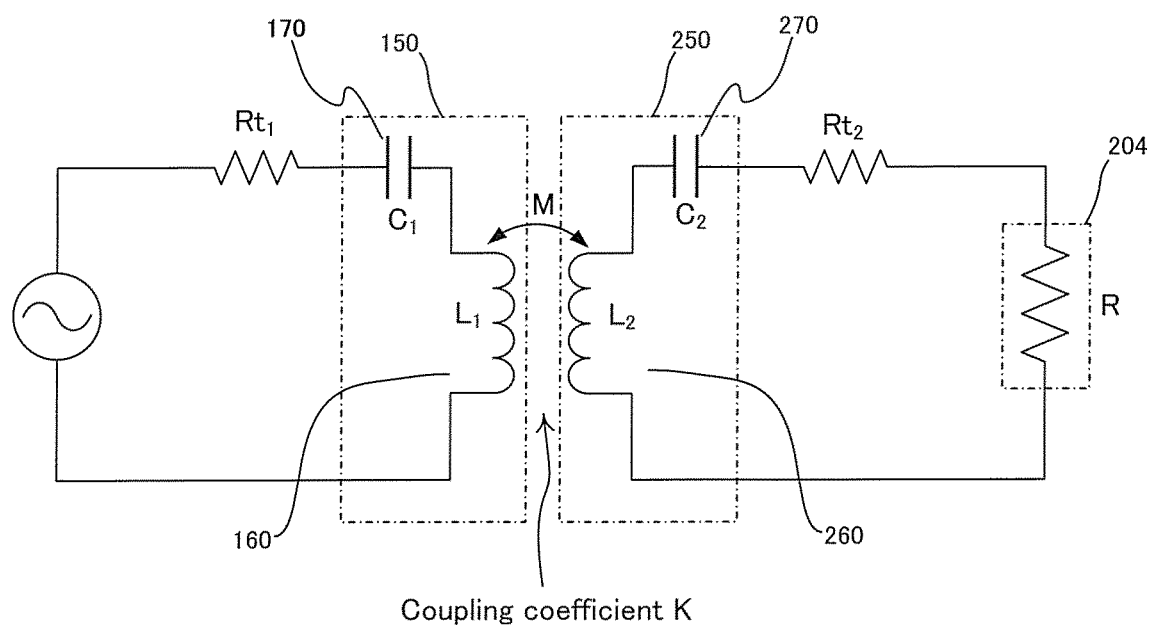
FIG. 3 is a view illustrating an equivalent circuit of the power transmission system 100 according to the embodiment of the present invention.

The following describes the circuit constant (inductance component, capacitance component) of each of the thus configured primary and secondary resonators 150 and 250. FIG. 3 is a view illustrating an equivalent circuit of the power transmission system 100 according to the embodiment of the present invention.

In the power transmission system 100 according to the present invention, the circuit constant (inductance component, capacitance component) of the primary resonator 150 and that of the secondary resonator 250 are consciously made to differ from each other so as to improve transmission efficiency.

In the equivalent circuit illustrated in FIG. 3, an inductance component, a capacitance component, and a resistance component of the primary resonator 150 are $L_1$, $C_1$, and $Rt_1$, respectively, those of the secondary resonator 250 are $L_2$, $C_2$, and $Rt_2$, respectively, and a mutual inductance between the primary resonator 150 and the secondary resonator 250 is M. The resistance components $Rt1$ and $Rt2$ are each an internal resistance of a conductive wire and are not provided purposefully. Further, R denotes an internal resistance of the battery 204. A coupling coefficient between the primary resonator 150 and the secondary resonator 250 is denoted by K.

Further, in the present embodiment, the primary resonator 150 constitutes a series resonator having the inductance component $L_1$ and capacitance component $C_1$, and the secondary resonator 250 constitutes a series resonator having the inductance component $L_2$ and capacitance component $C_2$.

First, in magnetic resonance power transmission, a resonance frequency of the primary resonator 150 on the power transmission system 100 side and that of the secondary resonator 250 on the power reception system 200 side are made equal to each other for efficient power transmission from the primary resonator 150 to secondary resonator 250 so as to allow efficient energy transmission from a transmission-side antenna (primary resonator 150) to a reception-side antenna (secondary resonator 250). The condition for this can be represented by the following expression (1).

[Numeral 1]

$$\frac{1}{2\pi\sqrt{L_1 C_1}} = \frac{1}{2\pi\sqrt{L_2 C_2}} \tag{1}$$

When the above expression (1) is represented only by a relationship among the inductance component $L_1$, capacitance component $C_1$, inductance component $L_2$, and capacitance component $C_2$, it can be simplified as the following expression (2).

[Numeral 1]

$$L_1 C_2 = L_2 C_2 \tag{2}$$

An impedance of the primary resonator 150 can be represented by the following expression (3), and an impedance of the secondary resonator 250 can be represented by the following expression (4). In the present specification, values defined by the following expressions (3) and (4) are defined as the impedances of the respective resonators.

[Numeral 3]

$$k\sqrt{\frac{L_1}{C_1}} \quad (3)$$

[Numeral 4]

$$k\sqrt{\frac{L_2}{C_2}} \quad (4)$$

In the power reception side system of the magnetic resonance power transmission system 100, when the battery 204 shifts to a constant voltage charging mode, an input impedance is varied by charging power since the voltage of the battery 204 is constant. When the charging power is large, the input impedance is low, while when the charging power is small, the input impedance is high. In terms of efficiency, it is desirable that the impedance of the secondary resonator 250 on the power reception side be set to a value close to the input impedance according to the charging power for the battery 204.

On the other hand, the higher the input impedance to the primary resonator 150 as viewed from a power source on the power transmission side, the better in terms of efficiency. This is because a loss occurs in proportion to the square of current due to a power source internal resistance.

Thus, it is desirable that the impedance of the primary resonator 150 represented by the expression (3) and the impedance of the secondary resonator 250 represented by the expression (4) have a relationship of the following expression (5).

[Numeral 5]

$$k\sqrt{\frac{L_1}{C_1}} > k\sqrt{\frac{L_2}{C_2}} \quad (5)$$

When the above expression (5) is represented only by a relationship among the inductance component $L_1$, capacitance component $C_1$, inductance component $L_2$, and capacitance component $C_2$, it can be simplified as the following expression (6).

[Numeral 6]

$$\frac{L_1}{C_1} > \frac{L_2}{C_2} \quad (6)$$

In the power transmission system 100 according to the present invention, the circuit constant of the primary resonator 150 and the circuit constant of the secondary resonator 250 satisfy the above expressions (2) and (6). Thus, when the battery 204 is charged on the power reception side system, efficient power transmission can be achieved.

Here, an internal impedance of the battery 204 is taken into consideration. In the power reception side system, when the impedance of the secondary resonator 250 and the impedance of the battery 204 are matched with each other, the battery 204 can be charged efficiently.

That is, in the present embodiment, in addition to the conditions of the expressions (2) and (6), the impedance of the secondary resonator 250 represented by the expression (4) and an impedance R of the battery 204 are allowed to have a relationship of the following expression (7).

[Numeral 7]

$$R = k\sqrt{\frac{L_2}{C_2}} \quad (7)$$

Thus, when the battery 204 is charged in the power reception side system, efficient power transmission can be achieved in the entire system.

The following describes noise leakage countermeasures taken in the thus configured power transmission system 100.

Figure 4:
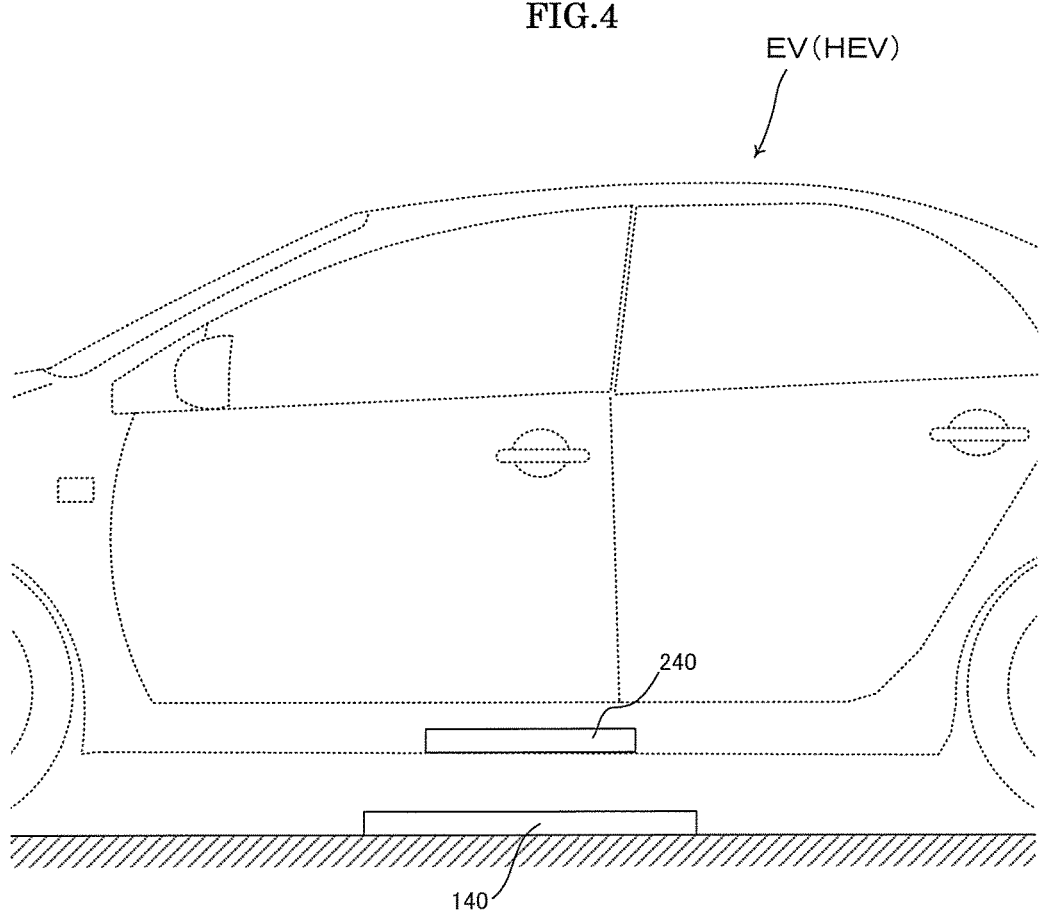
FIG. 4 is a view for explaining an installation form of a primary resonator and a secondary resonator in the power transmission system according to the embodiment of the present invention.

As described above, in the power transmission system 100 according to the present embodiment is used for charging a battery mounted on an electric vehicle (EV) or a hybrid electric vehicle (HEV). FIG. 4 is a view for explaining an installation form of the primary resonator 150 and secondary resonator 250 in the power transmission system according to the embodiment of the present invention.

As illustrated in FIG. 4, the primary resonator coil 160 and primary resonator capacitor 170 constituting the primary resonator 150 are housed in a primary resonator case 140 installed on the ground. On the other hand, the secondary resonator coil 260 and secondary resonance capacitor 270 constituting the secondary resonator 250 are housed in a secondary resonator case 240 attached to the vehicle bottom surface portion.

When the power transmission system 100 performs power transmission in the situation described above, an area where intensity of an electromagnetic field is high occurs in a peripheral portion where the primary resonator 150 and secondary resonator 250 do not face each other, resulting in leakage of noise.

Such an electromagnetic field leaking from the resonator during power transmission may enter a metal part of the vehicle to heat it or may leak from between the vehicle bottom surface and the ground to affect environment and human bodies.

To cope with this, in the power transmission system 100 according to the present invention, two noise cancellation resonators (a first noise cancellation resonator 300 and a second noise cancellation resonator 340) are disposed in the vicinity of the primary resonator 150 serving as the power transmission side antenna. This can reduce the leakage described above, thus making it possible to suppress environment and human bodies from being affected by the leakage of the electromagnetic field.

Figure 5:
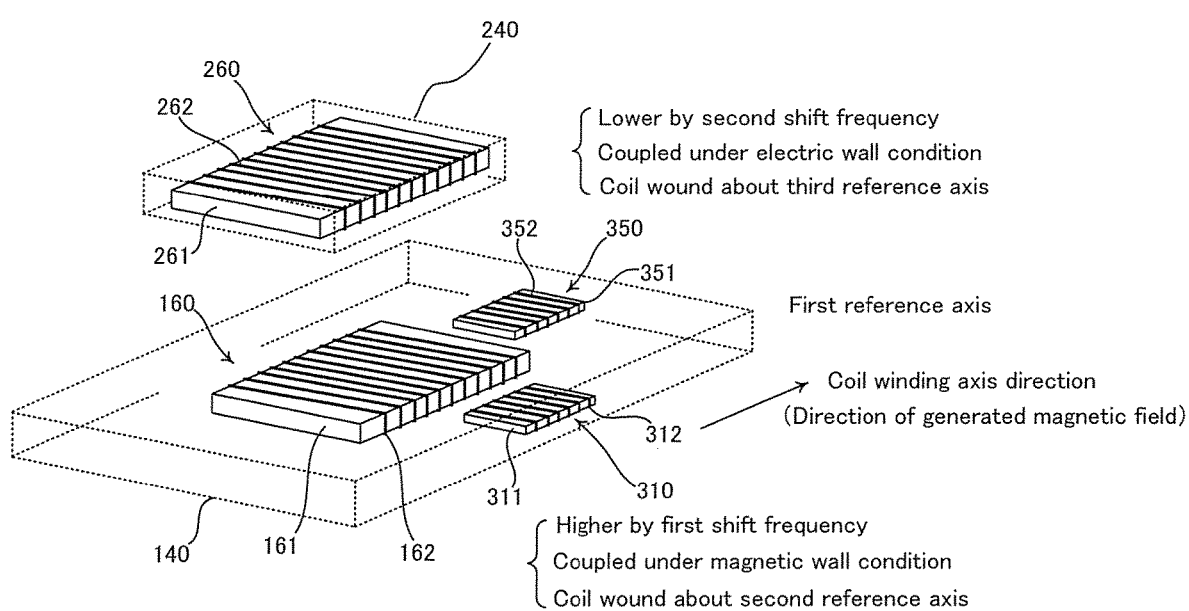
FIG. 5 is a view for explaining a layout of a primary resonator coil and a secondary resonator coil.

FIG. 5 is a view for explaining a layout of the primary resonator coil 160 and secondary resonator coil 260.

FIG. 5 is a view illustrating the primary resonator case 140 housing the primary resonator 150 and the secondary resonator case 240 housing the secondary resonator 250 in a state where they are extracted. In FIG. 5, only the primary resonator coil 160 of the primary resonator 150 is illustrated, and the primary resonator capacitor 170 is omitted. Similarly, only the secondary resonator coil 260 of the secondary resonator 250 is illustrated, and the secondary resonance capacitor 270 is omitted.

In the present embodiment, the primary resonator coil 160 is constituted of a ferrite substrate 161 and a coil winding 162 wound around the ferrite substrate 161, and the secondary resonator coil 260 is constituted of a ferrite substrate 261 and a coil winding 262 wound around the ferrite substrate 261. The primary resonator coil 160 is referred to also as a main coil. The primary resonator coil 160 (main coil) is defined as a coil formed by winding a conductive wire about a first reference axis parallel to the ground.

The first noise cancellation resonator 300 used in the present invention is formed by series connection of a first noise cancellation resonator coil 310 having an inductance component $L_{n1}$ and a first noise cancellation resonator capacitor 320 having an inductance component $C_{n1}$. In FIG. 5, only the first noise cancellation resonator coil 310 is illustrated, and the first noise cancellation resonator capacitor 320 is omitted. The first noise cancellation resonator coil 310 is constituted of a ferrite substrate 311 and a coil winding 312 wound around the ferrite substrate 311.

In the present embodiment, the first noise cancellation resonator coil 310 is formed by winding a conductive wire, outside a space formed by an extended surface of a winding end face of the primary resonator coil 160 (main coil), about a second reference axis parallel to the first reference axis.

The second noise cancellation resonator 340 used in the present invention is formed by series connection of a second noise cancellation resonator coil 350 having an inductance component $L_{n2}$ and a second noise cancellation resonator capacitor 360 having an inductance component $C_{n2}$. In FIG. 5, only the second noise cancellation resonator coil 350 is illustrated, and the second noise cancellation resonator capacitor 360 is omitted. The second noise cancellation resonator coil 350 is constituted of a ferrite substrate 351 and a coil winding 352 wound around the ferrite substrate 351.

In the present embodiment, the second noise cancellation resonator coil 350 is formed by winding a conductive wire, inside a space formed by the extended surface of the winding end face of the primary resonator coil 160, about a third reference axis parallel to the first reference axis.

The first and second noise cancellation resonators 300 and 340 will be described more in detail. The first and second noise cancellation resonators 300 and 340 used in the present invention are suitable for noise countermeasures taken particularly in the wireless power transmission system using a magnetic resonance antenna; however, they can improve noise reduction efficiency with respect to various noise sources as well as the noise source of the above power transmission system.

Figure 6:
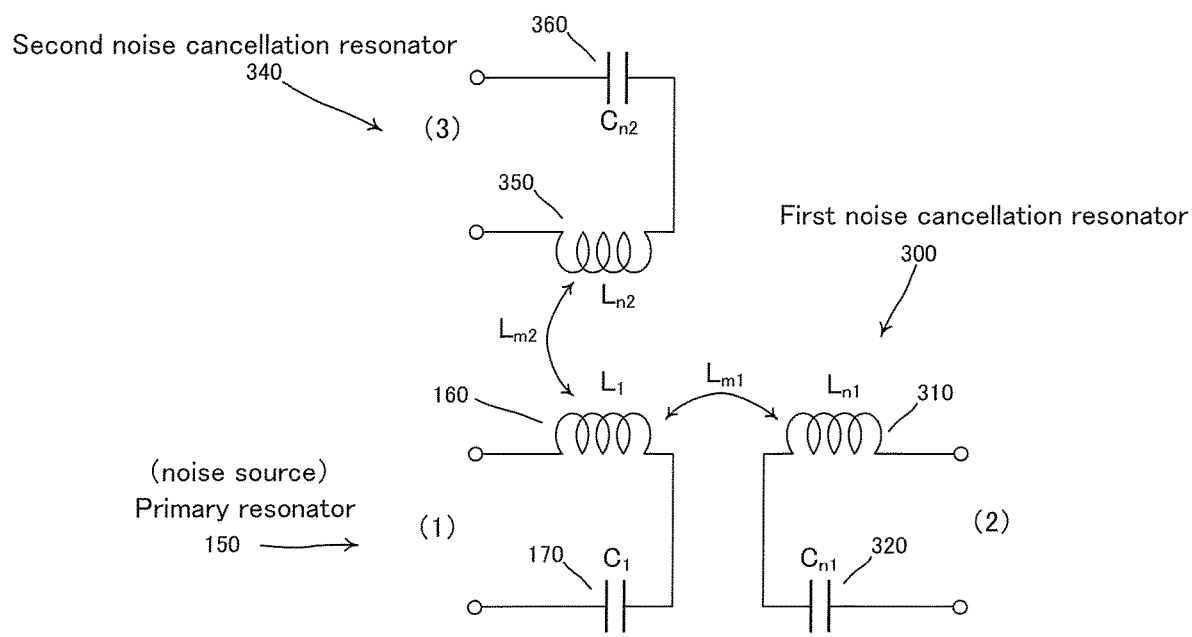
FIG. 6 is a view for explaining coupling between first and second noise cancellation resonators 300 and 340 according to the embodiment of the present invention and the primary resonator 150 as a noise source.

FIG. 6 is a view for explaining coupling between the first and second noise cancellation resonators 300 and 340 according to the embodiment of the present invention and the primary resonator 150 as the noise source.

In FIG. 6, the primary resonator 150 is used as a power transmission antenna of the power transmission system and generates an electromagnetic field of a predetermined fundamental frequency to transmit power to the secondary resonator 250 for power reception (not illustrated in FIG. 6) using the magnetic resonance method.

The primary resonator 150 is formed by series connection of the primary resonator coil 160 having the inductance component $L_1$ and the primary resonator capacitor 170 having the inductance component $C_1$.

On the other hand, the first noise cancellation resonator 300 is formed by series connection of the first noise cancellation resonator coil 310 having the inductance component $L_{n1}$ and the first noise cancellation resonator capacitor 320 having the inductance component $C_{n1}$ and does not contribute to the power transmission to the secondary resonator 250 but removes the electromagnetic field (noise) leaking from the primary resonator 150.

Further, the second noise cancellation resonator 340 is formed by series connection of the second noise cancellation resonator coil 350 having the inductance component $L_{n2}$ and the second noise cancellation resonator capacitor 360 having the inductance component $C_{n2}$ and does not contribute to the power transmission to the secondary resonator 250 but removes the electromagnetic field (noise) leaking from the primary resonator 150.

In FIG. 6, $L_{m1}$ denotes a mutual inductance between the primary resonator coil 160 and the first noise cancellation resonator coil 310.

Further, $L_{m2}$ denotes a mutual inductance between the primary resonator coil 160 and the second noise cancellation resonator capacitor 360.

Actually, the first and second noise cancellation resonators 300 and 340 each have a closed structure at a terminal part (2); however, in FIG. 6, characteristics of the first and second noise cancellation resonators 300 and 340 will be described by recognizing the first and second noise cancellation resonators 300 and 340 as power transmission circuits of power from the primary resonator 150 to the first and second noise cancellation resonators 300 and 340.

Figure 7:
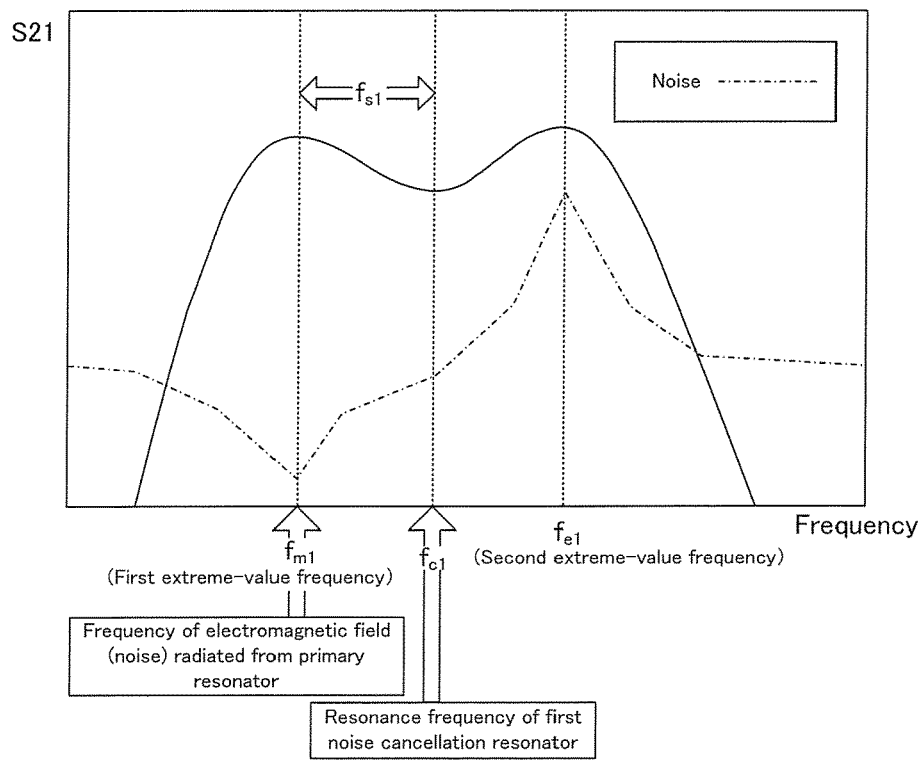
FIG. 7 is a view illustrating, in an overlapping manner, a frequency dependence of transmission efficiency and a frequency dependence of a noise emissivity.

FIG. 7 is a view illustrating, in an overlapping manner, a frequency dependence of transmission efficiency in a power transmission circuit formed by the primary resonator coil 160 and first noise cancellation resonator 300 and a frequency dependence of a noise emissivity. In FIG. 7, the horizontal axis represents a frequency, and S21 of the vertical axis denotes power that passes through a terminal (2) when a signal is input to a terminal (1).

As illustrated in FIG. 7, in the frequency characteristics of power transmission efficiency in the power transmission circuit of FIG. 6, two extreme values are given at two frequency points, respectively. In FIG. 7, a frequency exhibiting a lower extreme value is defined as a first extreme-value frequency $f_{m1}$, and a frequency exhibiting a higher extreme value is defined as a second extreme-value frequency $f_{e1}$. Further, in FIG. 7, $f_{c1}$ denotes a resonance frequency of the first noise cancellation resonator 300.

When power transmission is performed with the primary resonator 150 driven at the first extreme-value frequency which is the lower extreme-value frequency, the primary resonator coil 160 of the primary resonator 150 and the first noise cancellation resonator coil 310 of the first noise cancellation resonator 300 are coupled under a magnetic wall condition.

On the other hand, when power transmission is performed with the primary resonator 150 driven at the second extreme-value frequency which is the higher extreme-value frequency, the primary resonator coil 160 of the primary resonator 150 and the first noise cancellation resonator coil 310 of the first noise cancellation resonator 300 are coupled under an electric wall condition.

Figure 8:
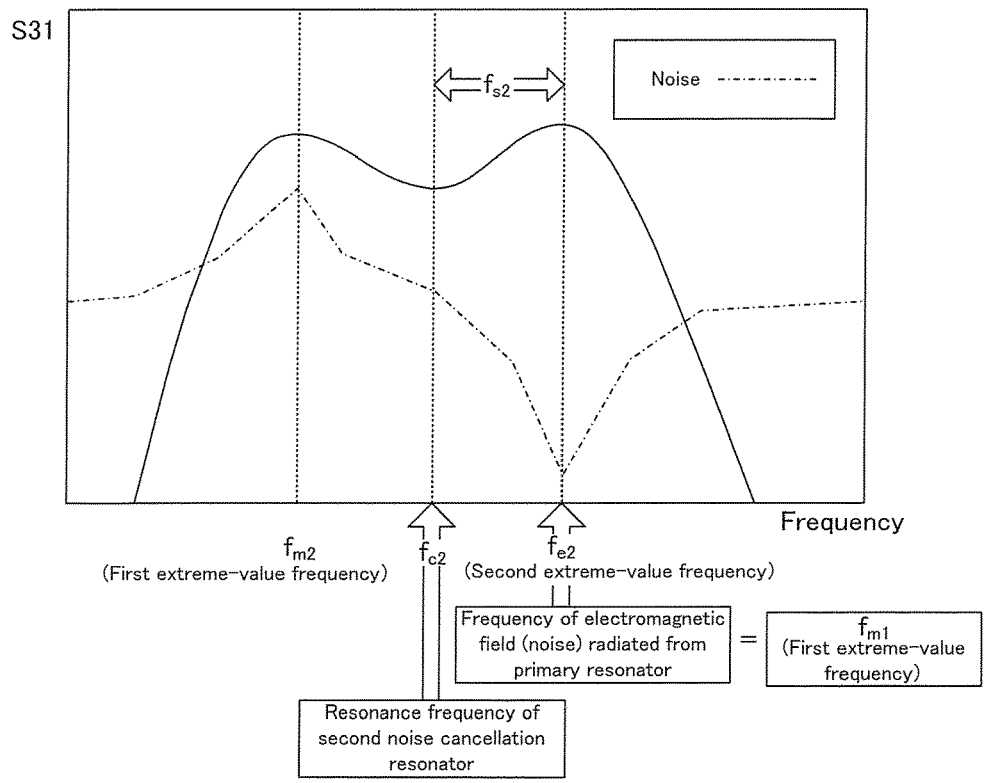
FIG. 8 is a view illustrating, in an overlapping manner, a frequency dependence of transmission efficiency and a frequency dependence of a noise emissivity.

FIG. 8 is a view illustrating, in an overlapping manner, a frequency dependence of transmission efficiency in a power transmission circuit formed by the primary resonator coil 160 and second noise cancellation resonator 340 and a frequency dependence of a noise emissivity. In FIG. 8, the horizontal axis represents a frequency, and S31 of the vertical axis denotes power that passes through a terminal (3) when a signal is input to a terminal (1).

As illustrated in FIG. 8, in the frequency characteristics of power transmission efficiency in the power transmission circuit of FIG. 6, two extreme values are given at two frequency points, respectively. In FIG. 8, a frequency exhibiting a lower extreme value is defined as a first extreme-value frequency $f_{m2}$, and a frequency exhibiting a higher extreme value is defined as a second extreme-value frequency $f_{e2}$. Further, in FIG. 8, $f_{c2}$ denotes a resonance frequency of the second noise cancellation resonator 340.

When power transmission is performed with the primary resonator 150 driven at the second extreme-value frequency which is the higher extreme-value frequency, the primary resonator coil 160 of the primary resonator 150 and the second noise cancellation resonator coil 350 of the second noise cancellation resonator 340 are coupled under an electric wall condition.

On the other hand, when power transmission is performed with the primary resonator 150 driven at the first extreme-value frequency which is the lower extreme-value frequency, the primary resonator coil 160 of the primary resonator 150 and the second noise cancellation resonator coil 350 of the second noise cancellation resonator 340 are coupled under a magnetic wall condition.

The second extreme-value frequency $f_{e2}$ in FIG. 8 is equal to the first extreme-value frequency $f_{m1}$, in FIG. 7.

The following describes concept of the electric wall and magnetic wall generated at a symmetry plane located between the primary resonator coil 160 of the primary resonator 150 and the first noise cancellation resonator coil 310 of the first noise cancellation resonator 300.

Figure 9:
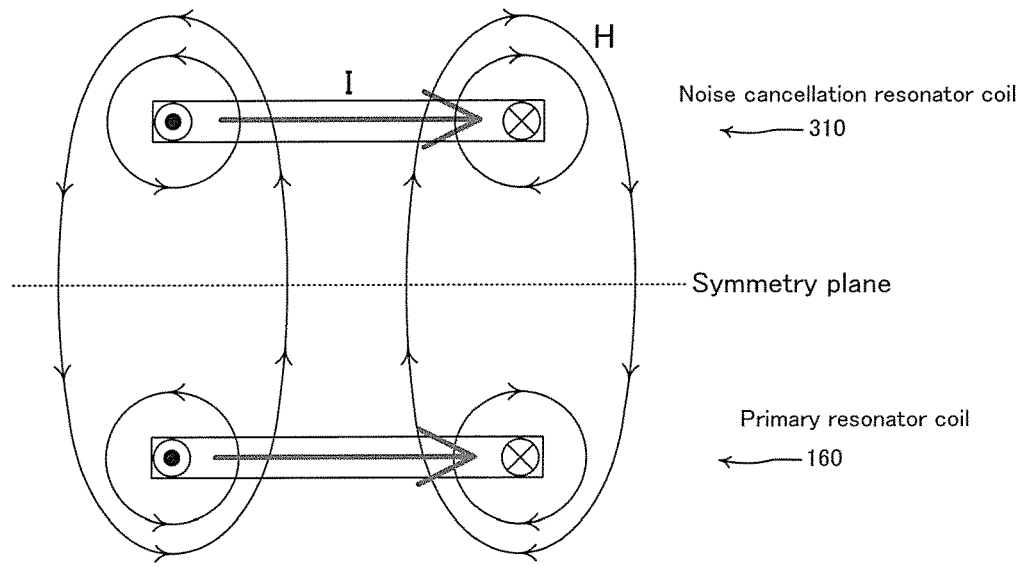
FIG. 9 is a view schematically illustrating the state of current and electric field at a first extreme-value frequency (frequency upon coupling under magnetic wall condition).

FIG. 9 is a view schematically illustrating the state of current and electric field at the first extreme-value frequency (frequency upon coupling under magnetic wall condition). At the first extreme-value frequency, a phase of the current flowing in the primary resonator coil 160 is substantially the same as that of the current flowing in the first noise cancellation resonator coil 310, and vectors of magnetic fields are aligned at around a middle point of the primary resonator coil 160 and first noise cancellation resonator coil 310. This state is regarded as generating a magnetic wall whose magnetic field is perpendicular to a symmetry plane located between the primary resonator coil 160 and the first noise cancellation resonator coil 310.

As illustrated in FIG. 9, when the primary resonator 150 and first noise cancellation resonator 300 are coupled under the magnetic wall condition, the magnetic filed from the primary resonator coil 160 goes into the first noise cancellation resonator coil 310.

Figure 10:
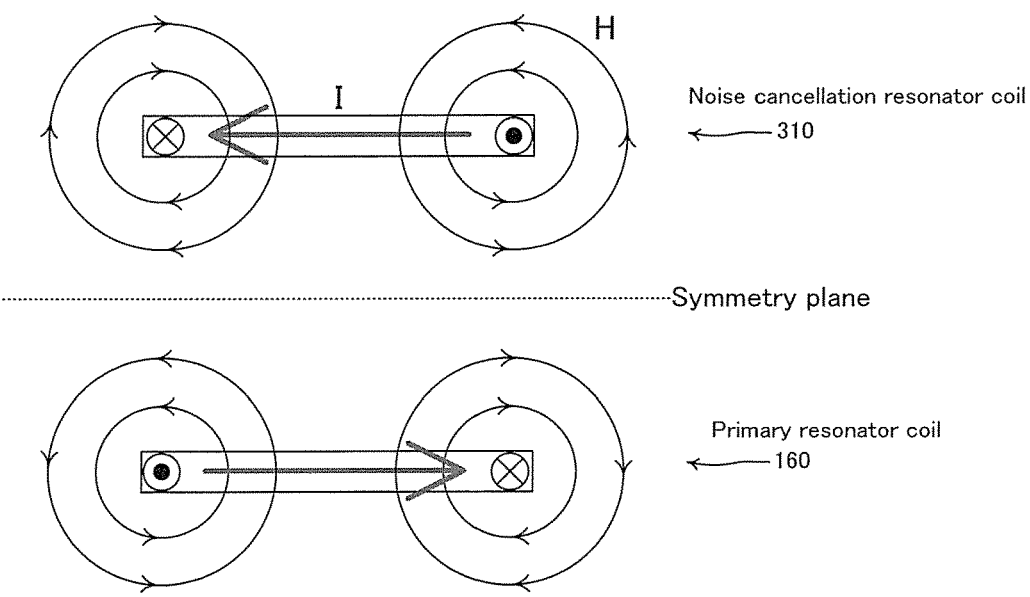
FIG. 10 is a view schematically illustrating the state of current and electric field at a second extreme-value frequency (frequency upon coupling under electric wall condition).

FIG. 10 is a view schematically illustrating the state of current and electric field at the second extreme-value frequency (frequency upon coupling under electric wall condition). At the second extreme-value frequency, a phase of the current flowing in the primary resonator coil 160 is substantially opposite to that of the current flowing in the first noise cancellation resonator coil 310, and vectors of magnetic fields are aligned at around the symmetry plane located between the primary resonator coil 160 and the first noise cancellation resonator coil 310. This state is regarded as generating an electric wall whose magnetic field is horizontal to the symmetry plane located between the primary resonator coil 160 and the first noise cancellation resonator coil 310.

As illustrated in FIG. 10, when the primary resonator 150 and first noise cancellation resonator 300 are coupled under the electric wall condition, the magnetic filed from the primary resonator coil 160 and that from the first noise cancellation resonator 300 exclude each other at the symmetry plane.

As for the concept of the electric and magnetic walls described above, what is described in the following documents and the like is adopted herein: Takehiro Imura, Youichi Hori, "Transmission technology with electromagnetic field resonant coupling", IEEJ Journal, Vol. 129, No. 7, 2009, and Takehiro Imura, Hiroyuki Okabe, Toshiyuki Uchida, Youichi Hori, "Research on magnetic field coupling and electric field coupling of non-contact power transmission in terms of equivalent circuits", IEEJ Trans. IA, Vol. 130, No. 1, 2010.

Here, it can be seen from the frequency characteristics (denoted by a dashed-dotted line in FIG. 7) of the noise radiation from the primary resonator 150 that the minimum value appears at the first extreme-value frequency (frequency upon coupling under magnetic wall condition), and the maximum value appears at the second extreme-value frequency (frequency upon coupling under electric wall condition).

With the above characteristics, in the present invention, resonator 300 is set such that a frequency of the electromagnetic field (noise) radiated from the primary resonator 150 coincides with the first extreme-value frequency $f_{m1}$ (frequency upon coupling under magnetic wall condition).

More specifically, the resonance frequency $f_{c1}$ of the first noise cancellation resonator 300 is set to a resonance frequency higher than a predetermined frequency ($f_{m1}$ in the present embodiment, which is referred to also as a noise reduction target frequency) of the electromagnetic field generated from the primary resonator 150 by a shift frequency $f_{s1}$ determined according to a coupling degree $k_1$ (lower case) between the primary resonator coil 160 and the first noise cancellation resonator coil 310.

The shift frequency $f_{s1}$ is determined according to the coupling degree $k_1$ between the primary resonator coil 160 and the first noise cancellation resonator coil 310. That is, the shift frequency $f_{s1}$ is determined by the mutual inductance $L_{m1}$ between the primary resonator coil 160 and the first noise cancellation resonator coil 310, and the above shift frequency $f_s$ can be calculated by the following expression (8).

[Numeral 8]

$$f_{s1} = \frac{1}{2\pi\sqrt{L_{m1}C_{n1}}} \tag{8}$$

Thus, the resonance frequency $f_{c1}$ of the first noise cancellation resonator 300 should be calculated by the following expression (9).

[Numeral 9]

$$f_{c1} = f_{m1} + f_{s1} \tag{9}$$

The above setting of the resonance frequency $f_{c1}$ of the first noise cancellation resonator 300 allows the primary resonator coil 160 of the primary resonator 150 as the noise source and the first noise cancellation resonator coil 310 to be coupled to each other under the magnetic wall condition. Thus, as can be seen from the frequency characteristics of the noise radiation of FIG. 7, the first noise cancellation resonator 300 can efficiently remove the noise radiated from the primary resonator 150.

According to the first noise cancellation resonator 300 used in the present invention, a high noise reduction effect can be achieved in noise countermeasures taken particularly in the wireless power transmission system using a magnetic resonance antenna.

The first noise cancellation resonator 300 used in the present invention is passive with respect to noise. Therefore, it is desirable that the characteristics of the first noise cancellation resonator 300 be almost the same as the level of an opposite-phase wave of noise. Further, it is desirable that the loss in the first noise cancellation resonator 300 be reduced as much as possible. As a result of experiments, it was confirmed that the noise reduction effect is high when a Q-value of the first noise cancellation resonator 300 is 50 or more.

The frequency of the electromagnetic field generated from the primary resonator 150 as the noise source includes not only the fundamental wave but also noise components of higher harmonic waves of the fundamental wave. Accordingly, there is a need to remove the noise components by using the first noise cancellation resonator 300.

As for the above higher harmonic waves, in a system that is likely to emit a higher harmonic wave whose frequency is an odd multiple of a frequency that is used to drive the primary resonator 150, a higher harmonic wave calculated by the following expression (10) is generated from the primary resonator 150. Therefore, the resonance frequency of the first noise cancellation resonator 300 should be determined by the following expression (11).

[Numeral 10]

$$f_{2n-1} = (2n-1)f_{m1} \quad (10)$$

(n is a natural number)

[Numeral 11]

$$f_{c1} = (2n-1)f_{m1} + f_{s1} \quad (11)$$

(n is a natural number)

In a system that is likely to emit a higher harmonic wave whose frequency is an even multiple of a frequency that is used to drive the primary resonator 150, a higher harmonic wave that is calculated by the following expression (12) is generated from the primary resonator 150. Therefore, the resonance frequency of the first noise cancellation resonator 300 should be determined by the following expression (13).

[Numeral 12]

$$f_{2n} = 2nf_{m1} \quad (12)$$

(n is a natural number)

[Numeral 13]

$$f_{c1} = 2nf_{m1} + f_{s1} \quad (13)$$

(n is a natural number)

Further, it can be seen from the frequency characteristics (denoted by a dashed-dotted line in FIG. 8) of the noise radiation from the primary resonator 150 that the maximum value appears at the first extreme-value frequency (frequency upon coupling under magnetic wall condition), and the minimum value appears at the second extreme-value frequency (frequency upon coupling under electric wall condition).

With the above characteristics, in the present invention, the resonance frequency $f_{c2}$ of the second noise cancellation resonator 340 is set such that the frequency of the electromagnetic field (noise) radiated from the primary resonator 150 coincides with the second extreme-value frequency $f_{e2}$ (frequency upon coupling under electric wall condition).

More specifically, the resonance frequency $f_{c2}$ of the second noise cancellation resonator 340 is set to a resonance frequency lower than a predetermined frequency ($f_{e2}$ in the present embodiment, which is equal to $f_{m1}$, the $f_{e2}$ being referred to also as a noise reduction target frequency) of the electromagnetic field generated from the primary resonator 150 by a shift frequency $f_{s2}$ determined according to a coupling degree $k_2$ (lower case) between the primary resonator coil 160 and the second noise cancellation resonator coil 350.

The shift frequency $f_{s2}$ is determined according to the coupling degree $k_2$ between the primary resonator coil 160 and the second noise cancellation resonator coil 350. That is, the shift frequency $f_{s2}$ is determined by the mutual inductance $L_{m2}$ between the primary resonator coil 160 and the second noise cancellation resonator coil 350, and the above shift frequency $f_{s2}$ can be calculated by the following expression (14).

[Numeral 14]

$$f_{s2} = \frac{1}{2\pi\sqrt{L_{m2}C_{n2}}} \quad (14)$$

Thus, the resonance frequency $f_{c2}$ of the second noise cancellation resonator 340 should be calculated by the following expression (15).

[Numeral 15]

$$f_{c2} = f_{m2} - f_{s2} \quad (15)$$

The above setting of the resonance frequency $f_{c2}$ of the second noise cancellation resonator 340 allows the primary resonator coil 160 of the primary resonator 150 as the noise source and the second noise cancellation resonator coil 350 to be coupled to each other under the electric wall condition. Thus, as can be seen from the frequency characteristics of the noise radiation of FIG. 8, the second noise cancellation resonator 340 can efficiently remove the noise radiated from the primary resonator 150.

The second extreme-value frequency $f_{e2}$ in FIG. 8 is equal to the first extreme-value frequency $f_{m1}$ in FIG. 7.

According to the second noise cancellation resonator 340 used in the present invention, a high noise reduction effect can be achieved in noise countermeasures taken particularly in the wireless power transmission system using a magnetic resonance antenna.

The second noise cancellation resonator 340 used in the present invention is passive with respect to noise. Therefore, it is desirable that the characteristics of the second noise cancellation resonator 340 be almost the same as the level of an opposite-phase wave of noise. Further, it is desirable that the loss in the second noise cancellation resonator 340 be reduced as much as possible. As a result of experiments, it was confirmed that the noise reduction effect is high when a Q-value of the second noise cancellation resonator 340 is 50 or more.

The frequency of the electromagnetic field generated from the primary resonator 150 as the noise source includes not only the fundamental wave but also noise components of higher harmonic waves of the fundamental wave. Accordingly, there is a need to remove the noise components by using the second noise cancellation resonator 340.

As for the above higher harmonic waves, in a system that is likely to emit a higher harmonic wave whose frequency is an odd multiple of a frequency that is used to drive the primary resonator 150, a higher harmonic wave calculated by the following expression (16) is generated from the primary resonator 150. Therefore, the resonance frequency of the second noise cancellation resonator 340 should be determined by the following expression (17).

[Numeral 16]

$$f_{2n-1}=(2n-1)f_{m2} \qquad (16)$$

(n is a natural number)

[Numeral 17]

$$f_{c2}=(2n-1)f_{m2}-f_{s2} \qquad (17)$$

(n is a natural number)

In a system that is likely to emit a higher harmonic wave whose frequency is an even multiple of a frequency that is used to drive the primary resonator 150, a higher harmonic wave that is calculated by the following expression (18) is generated from the primary resonator 150. Therefore, the resonance frequency of the second noise cancellation resonator 340 should be determined by the following expression (19).

[Numeral 18]

$$f_{2n}=2nf_{m2} \qquad (18)$$

(n is a natural number)

[Numeral 19]

$$f_{c2}=2nf_{m2}-f_{s2} \qquad (19)$$

(n is a natural number)

As described above, the first noise cancellation resonator coil 310 of the first noise cancellation resonator 300 used in the present invention is coupled to the primary resonator coil 160 of the primary resonator 150 under the magnetic wall condition. In this manner, the first noise cancellation resonator coil 310 is aimed at obtaining the noise reduction effect. This principle will be schematically described.

Figure 11:
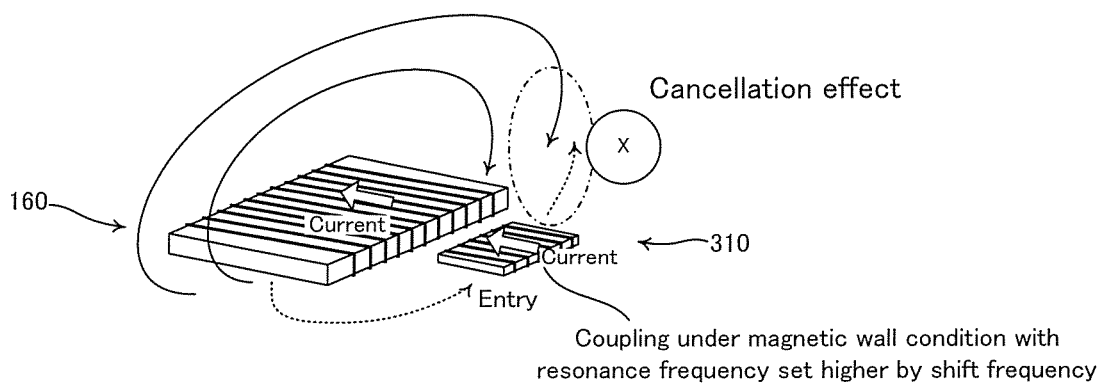
FIG. 11 are conceptual views each explaining how a noise reduction effect is improved by the first noise cancellation resonator.
Figure 11:
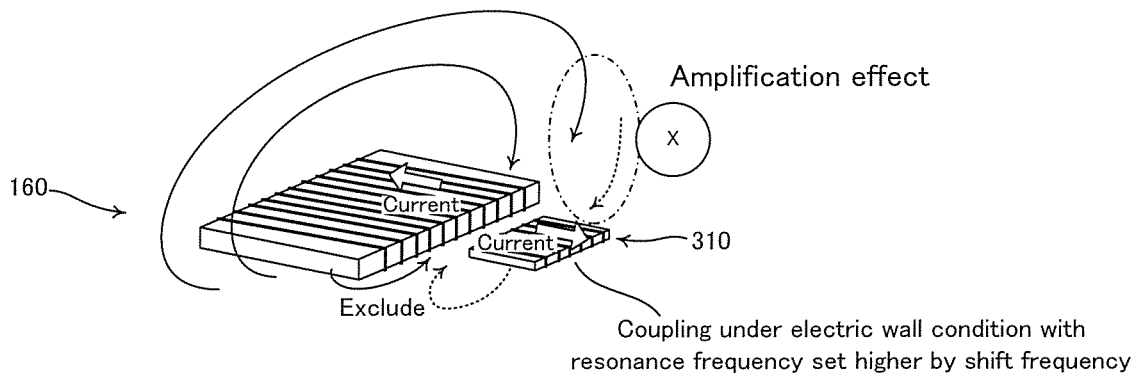

FIGS. 11A and 11B are conceptual views each explaining how the noise reduction effect is improved by the first noise cancellation resonator 300 according to the embodiment of the present invention.

FIG. 11A illustrates a case where the primary resonator coil 160 of the primary resonator 150 is coupled to the first noise cancellation resonator coil 310 of the first noise cancellation resonator 300 under the magnetic wall condition. In this case, a magnetic field from the primary resonator coil 160 goes into the first noise cancellation resonator coil 310. Based on this, a magnetic field that is generated at a point X is also expected to go into the first noise cancellation resonator coil 310. As a result, as surrounded by a dotted line, the magnetic field coming from the primary resonator coil 160 and the magnetic field going into the first noise cancellation resonator coil 310 cancel each other, with the result that a noise cancellation effect occurs.

FIG. 11B illustrates a case where the primary resonator coil 160 of the primary resonator 150 is coupled to the first noise cancellation resonator coil 310 of the first noise cancellation resonator 300 under the electric wall condition. In this case, the magnetic field from the primary resonator coil 160 and the magnetic field from the first noise cancellation resonator coil 310 exclude each other. Based on this, a magnetic field is expected to occur in such a way as to go into a point X. As a result, as surrounded by a dotted line, the magnetic field coming from the primary resonator coil 160 and the magnetic field coming from the first noise cancellation resonator coil 310 boost each other, with the result that the noise will be amplified.

As described above, the second noise cancellation resonator coil 350 of the second noise cancellation resonator 340 used in the present invention is coupled to the primary resonator coil 160 of the primary resonator 150 under the electric wall condition. In this manner, the second noise cancellation resonator coil 350 is aimed at obtaining the noise reduction effect. This principle will be schematically described.

Figure 12:
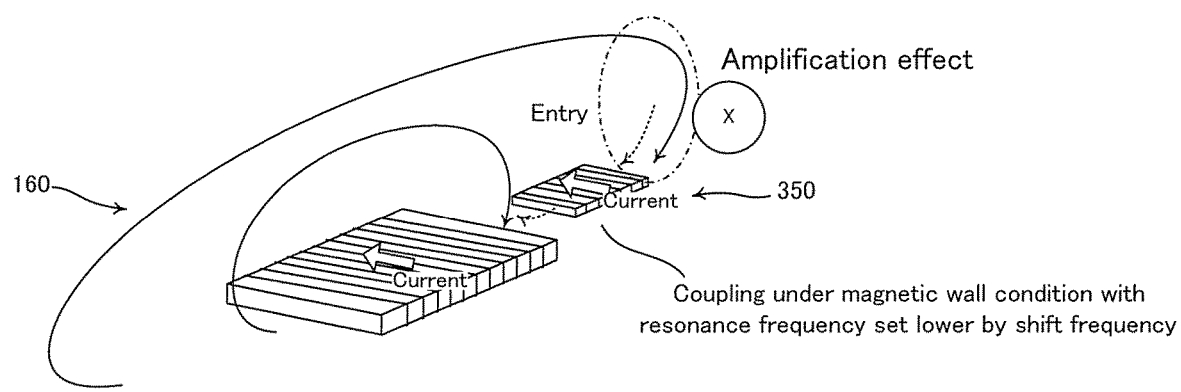
FIG. 12 are conceptual views each explaining how a noise reduction effect is improved by the second noise cancellation resonator.
Figure 12:
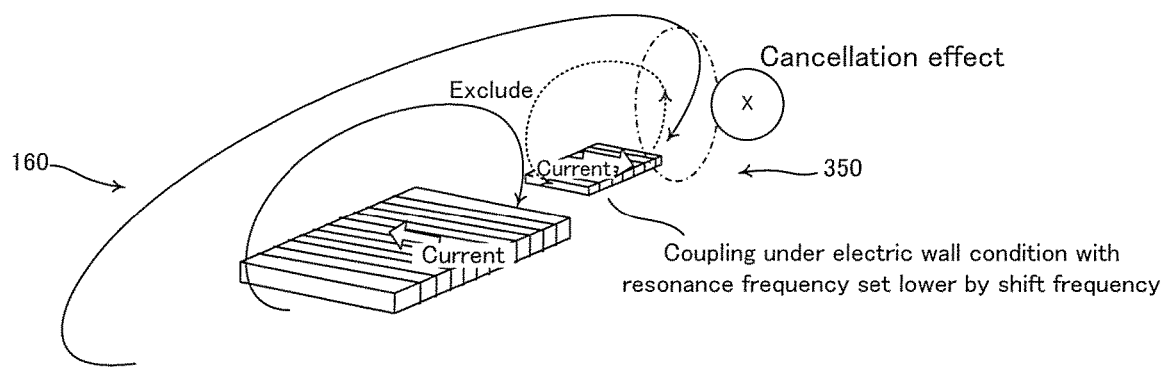

FIG. 12 are conceptual views each explaining how the noise reduction effect is improved by the second noise cancellation resonator 340 according to the embodiment of the present invention.

FIG. 12A illustrates a case where the primary resonator coil 160 of the primary resonator 150 is coupled to the second noise cancellation resonator coil 350 of the second noise cancellation resonator 340 under the magnetic wall condition. In this case, a magnetic field from the primary resonator coil 160 goes into the second noise cancellation resonator coil 350. Based on this, a magnetic field that is generated at a point X is also expected to go into the second noise cancellation resonator coil 350. As a result, as surrounded by a dotted line, the magnetic field coming from the primary resonator coil 160 and the magnetic field from the second noise cancellation resonator coil 350 boost each other, with the result that the noise will be amplified.

FIG. 12B illustrates a case where the primary resonator coil 160 of the primary resonator 150 is coupled to the second noise cancellation resonator coil 350 of the second noise cancellation resonator 340 under the electric wall condition. In this case, the magnetic field from the primary resonator coil 160 and the magnetic field from the second noise cancellation resonator coil 350 exclude each other. Based on this, a magnetic field is expected to occur in such a way as to go into a point X. As a result, as surrounded by a dotted line, the magnetic field coming from the primary resonator coil 160 and the magnetic field going into the second noise cancellation resonator coil 350 cancel each other, with the result that a noise cancellation effect occurs.

As described above, the power transmission system 100 according to the present invention includes the first noise cancellation resonator 300 and the second noise cancellation resonator 340 and is thus capable of suppressing occurrence of noise particularly in the wireless power transmission system using magnetic resonance antenna to thereby reduce noise leakage.

INDUSTRIAL APPLICABILITY

The power transmission system of the present invention is suitably used for a magnetic resonance wireless power transmission system to charge vehicles such as electric vehicles (EV) and hybrid electric vehicles (HEV), which have become increasingly popular in recent years. In a case where such a magnetic resonance wireless power transmission system is used for power supply to vehicles such as electric vehicles (EV) and hybrid electric vehicles (HEV), it is assumed that a resonator for power transmission is buried in the ground and that a resonator for power reception is mounted to a bottom portion of the vehicle.

In such a power transmission form, it is difficult for the transmission-side resonator and reception-side resonator to be completely electromagnetically coupled to each other, and much noise may be radiated from the resonator to cause a temperature rise of a metal part at the vehicle bottom. To cope with this problem, in the wireless power transmission system, it is necessary to discuss measures to reduce noise generated from the resonator. In the conventional technology, a resonance frequency of an LC resonator for noise cancellation is matched with a frequency of noise to be removed so as to increase a noise reduction effect. However, particularly in a wireless power transmission system that uses a magnetic resonance antenna, even when a frequency of the noise cancellation resonator is matched with the noise source frequency as a noise countermeasure, a high noise reduction effect cannot always be obtained.

The power transmission system according to the present invention includes the noise cancellation resonator having the noise cancellation resonator coil and has a resonance frequency higher than the predetermined frequency by a shift frequency determined according to a coupling degree between the primary resonator coil and the noise cancellation resonator coil. Thus, according to the power transmission system of the present invention, it is possible to suppress occurrence of noise particularly in the wireless power transmission system using a magnetic resonance antenna (resonator) and thereby to reduce noise leakage. Therefore, the industrial applicability is very high.

REFERENCE SIGNS LIST

100: Power transmission system
101: AC/DC conversion section
102: Voltage controller
103: Inverter section
104: Matching device
110: Main controller
120: Communication section
140: Primary resonator case
150: Primary resonator
160: Primary resonator coil
161: Ferrite substrate
162: Coil winding
170: Primary resonator capacitor
201: Secondary resonator
202: Rectifying section
203: Charge controller
204: Battery
210: Main controller
215: Interface section
220: Communication section
240: Secondary resonator case
250: Secondary resonator
260: Secondary resonator coil
261: Ferrite substrate
262: Coil winding
270: Secondary resonator capacitor
300: First noise cancellation resonator
310: First noise cancellation resonator coil
311: Ferrite substrate
312: Coil winding
320: First noise cancellation resonator capacitor
340: second noise cancellation resonator
350: Second noise cancellation resonator coil
351: Ferrite substrate
352: Coil winding
360: Second noise cancellation resonator capacitor

The invention claimed is:

1. A power transmission system that transmits electric energy to a secondary resonator having a secondary resonator coil through an electromagnetic field of a predetermined frequency generated from a primary resonator having a primary resonator coil and that reduces noise using two noise cancellation resonators with one of the predetermined frequency and its higher harmonic component set as a noise reduction target frequency, the system comprising, as the two noise cancellation resonators:

a first noise cancellation resonator that includes a first noise cancellation resonator coil and has a resonance frequency higher than the noise reduction target frequency by a first shift frequency determined according to a coupling degree between the primary resonator coil and the first noise cancellation resonator coil; and a second noise cancellation resonator that includes a second noise cancellation resonator coil and has a resonance frequency lower than the noise reduction target frequency by a second shift frequency determined according to a coupling degree between the primary resonator coil and the second noise cancellation resonator coil.

2. The power transmission system according to claim 1, wherein
the primary resonator coil includes a main coil formed by winding a conductive wire about a first reference axis parallel to ground, and
the first noise cancellation resonator coil is formed by winding a conductive wire, outside a space formed by an extended surface of a winding end face of the main coil, about a second reference axis parallel to the first reference axis.

3. The power transmission system according to claim 1, wherein
the primary resonator coil includes a main coil formed by winding a conductive wire about a first reference axis parallel to ground, and
the second noise cancellation resonator coil is formed by winding a conductive wire, inside a space formed by an extended surface of a winding end face of the main coil, about a third reference axis parallel to the first reference axis.

4. The power transmission system according to claim 1, wherein there first shift frequency is represented by an expression as follows:

$$f_{s1} = \frac{1}{2\pi\sqrt{L_{m1}C_{n1}}}$$

Where a mutual inductance component between the primary resonator coil and the first noise cancellation resonator coil is Lm1, and a capacitance component of the first noise cancellation resonator coil is Cn1.

5. The power transmission system according to claim 1, wherein
the second shift frequency is represented by an expression as follows:

$$f_{s2} = \frac{1}{2\pi\sqrt{L_{m2}C_{n2}}}$$

where a mutual inductance component between the primary resonator coil and the second noise cancellation resonator coil is $L_{m2}$, and a capacitance component of the second noise cancellation resonator coil is $C_{n2}$.

6. The power transmission system according to claim 1, wherein a Q-value of one of the first and second noise cancellation resonator coils is 50 or more.

* * * * *